United States Patent
Yuasa

(10) Patent No.: US 9,623,758 B2
(45) Date of Patent: Apr. 18, 2017

(54) POWER RECEPTION DEVICE, POWER TRANSMISSION DEVICE AND VEHICLE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 14/478,539

(22) Filed: Sep. 5, 2014

(65) Prior Publication Data

US 2015/0091514 A1    Apr. 2, 2015

(30) Foreign Application Priority Data

Oct. 1, 2013  (JP) .................................. 2013-206387

(51) Int. Cl.
*H02J 7/00* (2006.01)
*B60L 11/18* (2006.01)
*H02J 5/00* (2016.01)
*H02J 7/02* (2016.01)

(52) U.S. Cl.
CPC ............. *B60L 11/182* (2013.01); *H02J 5/005* (2013.01); *B60L 2240/485* (2013.01); *H02J 7/025* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ...................................... H02J 7/025
USPC ......................................... 320/108
See application file for complete search history.

(56) References Cited

U.S. PATENT DOCUMENTS

| 7,741,734 B2 | 6/2010 | Joannopoulos et al. |
| 7,948,208 B2* | 5/2011 | Partovi ................ H02J 7/0027 320/108 |
| 7,952,322 B2* | 5/2011 | Partovi .................. H01F 5/003 320/108 |
| 2007/0222542 A1 | 9/2007 | Joannopoulos et al. |
| 2008/0068212 A1* | 3/2008 | Tay ....................... G08C 15/00 340/870.02 |
| 2008/0278264 A1 | 11/2008 | Karalis et al. |
| 2009/0195332 A1 | 8/2009 | Joannopoulos et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Yalkew Fantu
(74) *Attorney, Agent, or Firm* — Oliff PLC

(57) ABSTRACT

A power reception device includes a core unit having a plate-like shape, a plate-like fixing member having the core unit housed therein, a power reception coil, and a temperature measuring unit. Assuming that a side surface wound portion refers to a portion of a side surface of core unit around which the power reception coil is wound, and a center portion refers to a portion located at the center of the side surface wound portion in an extending direction of a coil winding axis and at the center of the core unit in a thickness direction, temperature measuring unit is provided in at least one of a high-temperature region including the center portion of the core unit and a portion around the center portion, and a position on a surface of the fixing member that faces the high-temperature region.

10 Claims, 12 Drawing Sheets

(56) References Cited

U.S. PATENT DOCUMENTS

| | | |
|---|---|---|
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0277121 A1* | 11/2010 | Hall ..................... B60L 11/182 320/108 |
| 2012/0119914 A1* | 5/2012 | Uchida ................... H02J 5/005 340/584 |
| 2012/0262002 A1* | 10/2012 | Widmer ............... H04B 5/0037 307/104 |
| 2013/0107023 A1 | 5/2013 | Tanaka et al. |
| 2013/0127409 A1 | 5/2013 | Ichikawa |
| 2013/0193749 A1 | 8/2013 | Nakamura et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 103094974 A | 5/2013 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2009-501510 | 1/2009 |
| JP | 2010-172084 A | 8/2010 |
| JP | A-2012-182258 | 9/2012 |
| JP | A-2013-055229 | 3/2013 |
| JP | 2013-112047 A | 6/2013 |
| JP | A-2013-110822 | 6/2013 |
| JP | A-2013-126327 | 6/2013 |
| JP | A-2013-146148 | 7/2013 |
| JP | A-2013-146154 | 7/2013 |
| JP | 2013-165616 A | 8/2013 |
| JP | A-2013-154815 | 8/2013 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

* cited by examiner

POWER RECEPTION DEVICE, POWER TRANSMISSION DEVICE AND VEHICLE

This nonprovisional application is based on Japanese Patent Application No. 2013-206387 filed on Oct. 1, 2013 with the Japan Patent Office, the entire contents of which are hereby incorporated by reference.

BACKGROUND OF THE INVENTION

Field of the Invention

The present invention relates to a power reception device and a power transmission device that receive and transmit electric power in a contactless manner, and a vehicle including the power reception device.

Description of the Background Art

As disclosed in Japanese Patent Laying-Open No. 2012-182258, Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327, there are known a power reception device and a power transmission device that receive and transmit electric power in a contactless manner. A power reception device disclosed in Japanese Patent Laying-Open No. 2012-182258 includes a spiral coil (also referred to as a planar coil) formed by a spiral winding, and a film-like temperature sensor having a thermosensitive portion. This document describes that the thermosensitive portion is placed to be wound around a part of the winding, and thereby, the temperature of the spiral coil can be accurately measured.

SUMMARY OF THE INVENTION

A study of the spiral coil is being advanced, while a study of a so-called solenoid-type coil unit formed by winding a coil around a plate-like core made of ferrite or the like is also being advanced. The temperature of the core used in the solenoid-type coil unit must also be accurately measured.

Specifically, for example, when an attempt is made to reduce the size of a power reception device and a power transmission device, the heat capacity of a core used in these devices decreases and the allowable temperature of the core decreases. When the temperature of the core exceeds an allowable value, a loss increases, and the power transfer efficiency decreases or the equipment arranged around the core is affected. Therefore, in order to prevent the temperature of the core from exceeding the allowable value, the temperature of a high-temperature portion (e.g., a portion whose temperature becomes the highest) of the core must be accurately measured.

An object of the present invention is to provide a power reception device and a power transmission device that allow accurate measurement of the temperature of a high-temperature portion of a core, and a vehicle including the power reception device.

A power reception device is a power reception device that receives electric power from a power transmission device having a power transmission coil in a contactless manner, with the power reception device facing the power transmission device, the power reception device including: a core unit having a plate-like shape and including a side surface, an upper surface and a lower surface; a plate-like fixing member having the core unit housed therein; a power reception coil formed to be spirally wound around a perimeter surface of the fixing member to surround a coil winding axis; and a temperature measuring unit for measuring a temperature of the core unit, wherein assuming that a side surface wound portion refers to a portion of the side surface of the core unit around which the power reception coil is wound, and a center portion refers to a portion located at the center of the side surface wound portion in an extending direction of the coil winding axis and at the center of the core unit in a thickness direction, the temperature measuring unit is provided in at least one of a high-temperature region including the center portion of the core unit and a portion around the center portion, and a position on a surface of the fixing member that faces the high-temperature region.

According to the aforementioned configuration, a part of the power reception coil located on the side surface of the core unit, a part of the power reception coil located on the upper surface of the core unit, and a part of the power reception coil located on the lower surface of the core unit are arranged in the portion around the center portion. When a current flows through the power reception coil, the current flows through each of the aforementioned portions and a magnetic flux is formed around each of the aforementioned portions, which raises the temperature of the center portion and the portion around the center portion. Thus, the temperature measuring unit is provided in the high-temperature region including the center portion and the portion around the center portion, or the position on the surface of the fixing member that faces the high-temperature region, and thereby, the temperature of the high-temperature portion of the core unit can be accurately measured.

Preferably, the portion around the center portion is a region including a peripheral region of the side surface located on the periphery of the center portion, an upper surface adjacent region of the upper surface adjacent to the peripheral region, and a lower surface adjacent region of the lower surface adjacent to the peripheral region. When a current flows through the power reception coil, the temperature of not only the center portion but also the peripheral region, the upper surface adjacent region and the lower surface adjacent region serving as the portion around the center portion becomes high. According to the aforementioned configuration, the temperature measuring unit measures the temperature of these high-temperature regions, and thereby, the temperature of the high-temperature portion of the core unit can be accurately measured.

Preferably, the peripheral region is a region closer to the center portion in the extending direction of the coil winding axis than one end of a portion in which the power reception coil is wound around the fixing member, and closer to the center portion in the extending direction of the coil winding axis than the other end of the portion in which the power reception coil is wound around the fixing member, and the upper surface adjacent region and the lower surface adjacent region are regions located at a position closer to the side surface of the core unit than the coil winding axis in a direction orthogonal to the coil winding axis. According to the aforementioned configuration, the temperature measuring unit measures the temperature of these high-temperature regions, and thereby, the temperature of the high-temperature portion of the core unit can be accurately measured.

Preferably, the core unit includes a plurality of divided cores arranged side by side in a row direction and/or in a column direction. According to the aforementioned configuration, there is a gap between the divided cores, and thus, the heat transfer coefficient between the divided cores is low. Therefore, the temperature of the divided cores located in the high-temperature region is likely to become high. Thus, the temperature of the divided cores is measured, and thereby, the temperature of the possibly highest-temperature portion of the core unit can be accurately detected.

Preferably, the temperature measuring unit is provided at the fixing member, and the temperature measuring unit is arranged to face the high-temperature region, with the fixing member interposed therebetween. According to the aforementioned configuration, the temperature measuring unit is provided at the fixing member, and thereby, the temperature measuring unit can be easily arranged during the manufacturing process, and attachment/removal and replacement of the temperature measuring unit are also easy. Furthermore, the temperature measuring unit is arranged in the portion on the surface of the fixing member that faces the high-temperature region, and thereby, the temperature of the high-temperature portion of the core unit can be indirectly detected based on the surface temperature of the fixing member.

A vehicle of a first aspect includes: the aforementioned power reception device; and a vehicle main body having an exhaust pipe on a bottom surface thereof, wherein the power reception device is arranged below the exhaust pipe, and the temperature measuring unit is arranged to face the upper surface of the core unit. According to the aforementioned configuration, because the temperature of the upper surface of the core unit becomes high due to the heat from the exhaust pipe, the temperature measuring unit measures the temperature of this high-temperature region, and thereby, the temperature of the high-temperature portion of the core unit can be accurately measured.

A vehicle of a second aspect includes: a control unit; a communication unit for communicating with a power transmission device provided outside the vehicle; and the aforementioned power reception device, wherein when the control unit determines that the temperature measured by the temperature measuring unit is equal to or higher than a threshold value, the control unit transmits a signal for stopping power transmission to the power transmission device through the communication unit. By stopping power transmission, excessive heat generation by the core unit can be suppressed or prevented.

A vehicle of a third aspect includes: a control unit; a communication unit for communicating with a power transmission device provided outside the vehicle; and the aforementioned power reception device, wherein when the control unit determines that the temperature measured by the temperature measuring unit is equal to or higher than a threshold value, the control unit transmits a signal for reducing transmitted electric power to the power transmission device through the communication unit. By reducing the transmitted electric power, excessive heat generation by the core unit can be suppressed or prevented.

Preferably, when the control unit determines that the temperature measured by the temperature measuring unit is lower than the threshold value, the control unit transmits a signal for starting or continuing power transmission to the power transmission device through the communication unit. For example, power transmission is stopped temporarily to decrease the temperature of the core unit and then power transmission is started again, and thereby, efficient power transfer becomes possible. In addition, the control unit continuously monitors whether the temperature is lower than the threshold value or not, and thereby, efficient power transfer becomes possible.

A power transmission device is a power transmission device that transmits electric power to a power reception device having a power reception coil in a contactless manner, with the power transmission device facing the power reception device, the power transmission device including: a core unit having a plate-like shape and including a side surface, an upper surface and a lower surface; a plate-like fixing member having the core unit housed therein; a power transmission coil formed to be spirally wound around a perimeter surface of the fixing member to surround a coil winding axis; and a temperature measuring unit for measuring a temperature of the core unit, wherein assuming that a side surface wound portion refers to a portion of the side surface of the core unit around which the power transmission coil is wound, and a center portion refers to a portion located at the center of the side surface wound portion in an extending direction of the coil winding axis and at the center of the core unit in a thickness direction, the temperature measuring unit is provided in at least one of a high-temperature region including the center portion of the core unit and a portion around the center portion, and a position on a surface of the fixing member that faces the high-temperature region.

According to the present invention, there can be provided a power reception device and a power transmission device that allow accurate measurement of the temperature of a high-temperature portion of a core, and a vehicle including the power reception device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
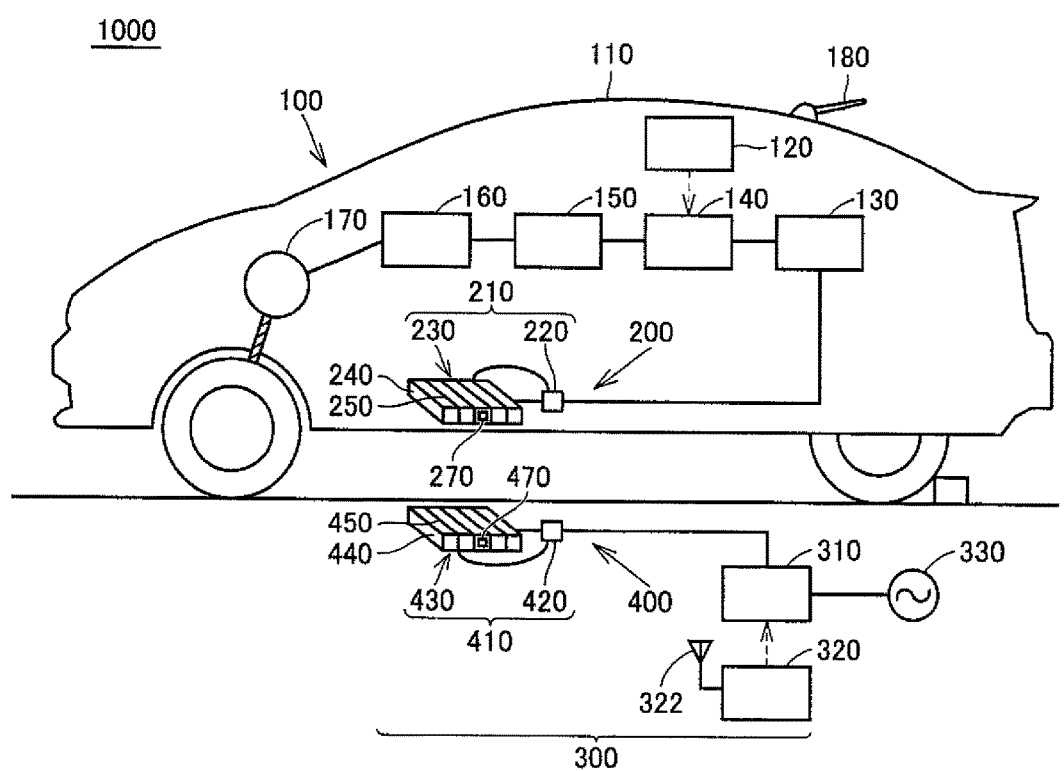
FIG. 1 is a diagram schematically showing a power transfer system in an embodiment.

An embodiment based on the present invention will be described hereinafter with reference to the drawings. When the number, an amount or the like is mentioned in the description of the embodiment, the scope of the present invention is not necessarily limited to that number, that amount or the like, unless otherwise specified. In the description of the embodiment and each example, the same and corresponding components are denoted by the same reference numerals, and redundant description will not be repeated.

A power transfer system 1000 in an embodiment will be described with reference to FIG. 1. FIG. 1 is a diagram schematically showing an overall configuration of power transfer system 1000. Power transfer system 1000 includes an electric powered vehicle 100 (vehicle) and an external power feeding device 300. Overall configurations of electric powered vehicle 100 and external power feeding device 300 will be described hereinafter in this order.

(Electric Powered Vehicle 100)

Referring mainly to FIG. 1, electric powered vehicle 100 includes a vehicle main body 110 and a power reception device 200. Vehicle main body 110 is provided with a vehicle ECU 120 (control unit), a rectifier 130, a DC/DC converter 140, a battery 150, a power control unit 160, a motor unit 170, a communication unit 180 and the like. Power reception device 200 has a power reception coil 250, which is arranged on a bottom surface of vehicle main body 110 (the details will be described below).

On the other hand, external power feeding device 300 includes a power transmission device 400, and power transmission device 400 has a power transmission coil 450. Although the details will be described below, power reception device 200 receives electric power from power transmission device 400 in a contactless manner, with power reception coil 250 of power reception device 200 facing power transmission coil 450 of power transmission device 400.

Power reception device 200 includes a power reception unit 210, a housing 280 (refer to FIGS. 2 to 5) that houses power reception unit 210, and a temperature measuring unit 270 for measuring the temperature of power reception unit 210 (specifically, a core unit 240). Power reception unit 210 has a solenoid-type coil unit 230, and a capacitor 220 connected to coil unit 230. Coil unit 230 is formed by core unit 240, a fixing member 260 (refer to FIGS. 3 to 5) made of resin, for sandwiching and fixing core unit 240, and power reception coil 250. Core unit 240 is formed by combining a plurality of divided cores 241 to 248 (refer to FIG. 6).

Figure 2:
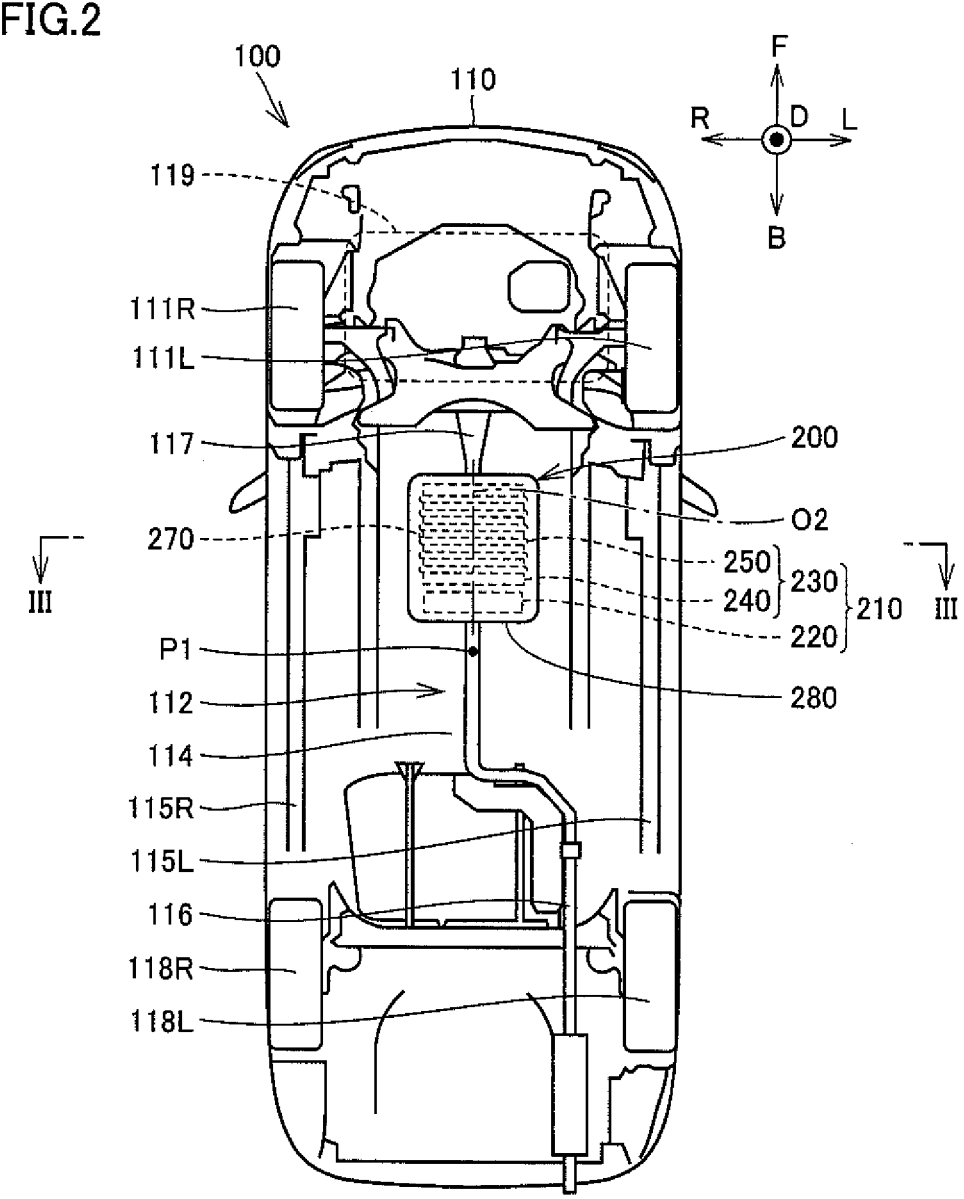
FIG. 2 is a bottom view showing an electric powered vehicle in the embodiment.
Figure 3:
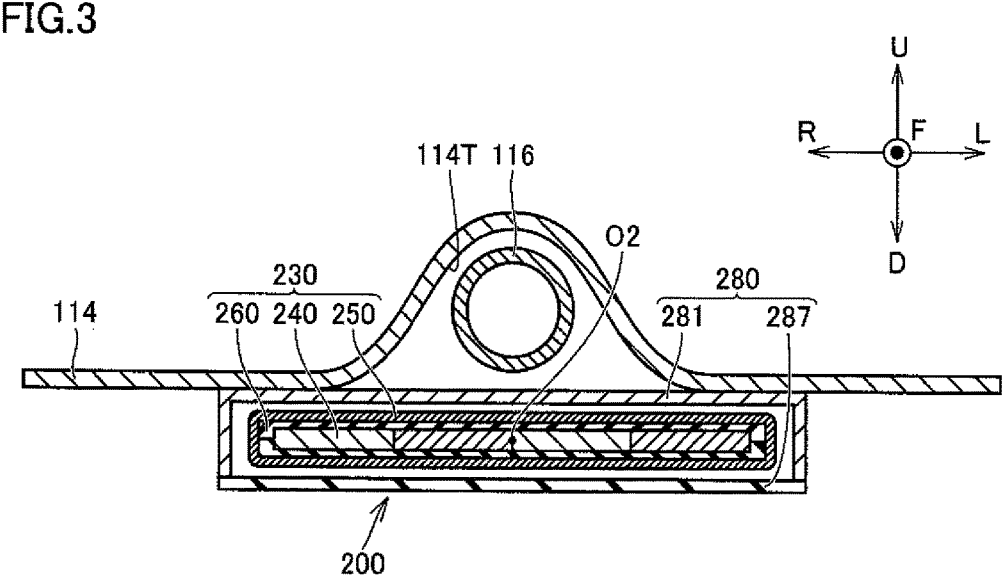
FIG. 3 is a cross-sectional view taken along line III-III in FIG. 2.

Power reception coil 250 is formed to be wound around an outer perimeter surface of the aforementioned fixing member to surround a coil winding axis O2 (refer to FIGS. 2 and 3). Coil winding axis O2 extends toward the direction parallel to the frontward-backward direction of vehicle main body 110. Power reception coil 250 has stray capacitance and is connected to rectifier 130. An induction coefficient of power reception coil 250 as well as the stray capacitance of power reception coil 250 and electric capacitance of capacitor 220 form an electrical circuit. Capacitor 220 and power reception coil 250 are connected serially, although they may be connected in parallel. The number of turns of power reception coil 250 is appropriately set such that a distance from power transmission coil 450 of power transmission device 400, a Q value (e.g., Q≥100) indicative of the resonance intensity of power transmission coil 450 and power reception coil 250, a coupling coefficient κ indicative of the degree of coupling between power transmission coil 450 and power reception coil 250, and the like become large.

DC/DC converter 140 is connected to rectifier 130. Rectifier 130 converts an AC current supplied from power reception device 200 into a DC current, and supplies the DC current to DC/DC converter 140, Battery 150 is connected to DC/DC converter 140. DC/DC converter 140 adjusts a voltage of the DC current supplied from rectifier 130, and supplies the DC current to battery 150.

Vehicle ECU 120 controls driving of DC/DC converter 140, power control unit 160 and the like. DC/DC converter 140 is not an essential component and may be used as needed. When DC/DC converter 140 is not used, a matching device may be provided between power transmission device 400 and a high-frequency power device 310 of external power feeding device 300. This matching device matches the impedance and can be used in place of DC/DC converter 140.

Power control unit 160 is connected to battery 150. Motor unit 170 is connected to power control unit 160, Power control unit 160 includes a not-shown converter connected to battery 150, and a not-shown inverter connected to this converter.

The converter adjusts (boosts) the DC current supplied from battery 150, and supplies the DC current to the inverter. The inverter converts the DC current supplied from the converter into an AC current, and supplies the AC current to motor unit 170. Motor unit 170 includes a motor generator serving as a generator, and a motor generator serving as a motor. A three-phase AC motor can, for example, be used as motor unit 170. Motor unit 170 is driven by the AC current supplied from the inverter of power control unit 160.

Vehicle ECU 120 controls driving of the equipment provided within vehicle main body 110. For example, when the operation mode of the vehicle is the traveling mode, vehicle ECU 120 instructs execution of traveling control by power control unit 160. In accordance with the state of operation of an accelerator pedal and a brake pedal, the state of traveling of the vehicle, and the like, vehicle ECU 120 outputs a control command to power control unit 160.

In the case where vehicle ECU 120 detects that a power feeding button has been turned on when vehicle main body 110 is in a stop state, the operation mode of the vehicle is switched to the charging mode. Through communication unit 180, vehicle ECU 120 instructs execution of charging control of battery 150 by external power feeding device 300.

(External Power Feeding Device 300)

External power feeding device 300 includes power transmission device 400, high-frequency power device 310, a power transmission ECU 320, and a communication unit 322. High-frequency power device 310 is connected to an AC power supply 330. AC power supply 330 is a commercial power supply device, an independent power supply device or the like. Power transmission device 400 is provided within a parking space and connected to high-frequency power device 310. Power transmission ECU 320 controls driving of high-frequency power device 310 and the like.

Communication unit 322 is a communication interface for carrying out wireless communication between external power feeding device 300 and electric powered vehicle 100. Communication unit 322 receives the battery information, the signals for instructing start, continuation and stop of power transmission, the signal for instructing increase or decrease in transmitted electric power, and the like which are transmitted from communication unit 180 of electric powered vehicle 100, and outputs the information to power transmission ECU 320.

Power transmission device 400 includes a power transmission unit 410, a housing (not shown) that houses power transmission unit 410, and a temperature measuring unit 470 for measuring the temperature of power transmission unit 410 (specifically, a core unit 440). Power transmission unit 410 has a solenoid-type coil unit 430, and a capacitor 420 connected to coil unit 430. Coil unit 430 is formed by core unit 440, a fixing member (not shown) made of resin, for sandwiching and fixing core unit 440, and power transmission coil 450. Similarly to divided cores 241 to 248 (refer to FIG. 6) in core unit 240, core unit 440 is formed by combining a plurality of not-shown divided cores.

Power transmission coil 450 is formed to be wound around an outer perimeter surface of the aforementioned fixing member to surround a coil winding axis (not shown). The coil winding axis extends toward the direction parallel to the frontward-backward direction of the parking space. The frontward-backward direction of the parking space refers to the direction corresponding to the frontward-backward direction of electric powered vehicle 100 when electric powered vehicle 100 stops at a prescribed position in the parking space where power transfer is possible. For example, the coil winding axis extends toward the direction parallel to a parking line located on the right and left sides of the vehicle. For example, the coil winding axis extends toward the direction orthogonal to the arrangement direction of a wheel stopper located on the backward side of the vehicle (at the back in the parking space).

Power transmission coil 450 has stray capacitance and is connected to high-frequency power device 310. An induction coefficient of power transmission coil 450 as well as the stray capacitance of power transmission coil 450 and electric capacitance of capacitor 420 form an electrical circuit. Capacitor 420 and power transmission coil 450 are connected serially, although they may be connected in parallel. High-frequency power device 310 converts electric power received from AC power supply 330 into high-frequency electric power, and supplies the converted high-frequency electric power to power transmission coil 450. Power transmission coil 450 transmits the electric power to power reception coil 250 of power reception unit 210 in a contactless manner by electromagnetic induction.

(Bottom Surface Configuration of Electric Powered Vehicle 100)

Figure 18:
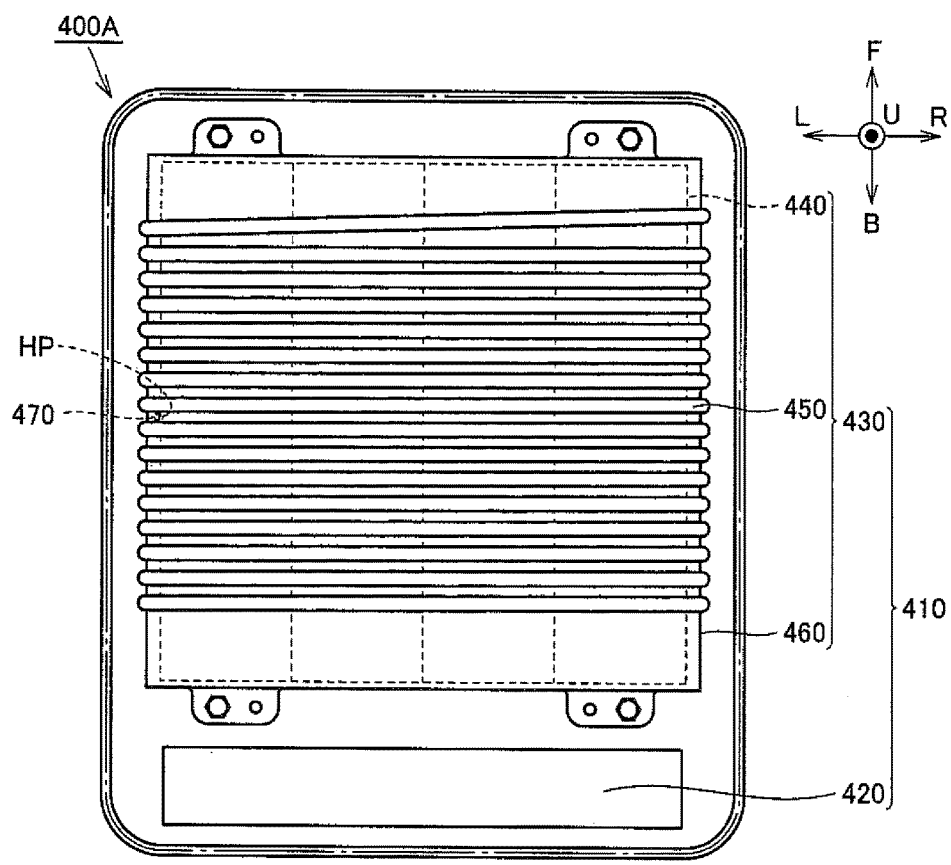
FIG. 18 is a plan view showing a power transmission device included in the electric powered vehicle in the embodiment.
Figure 19:
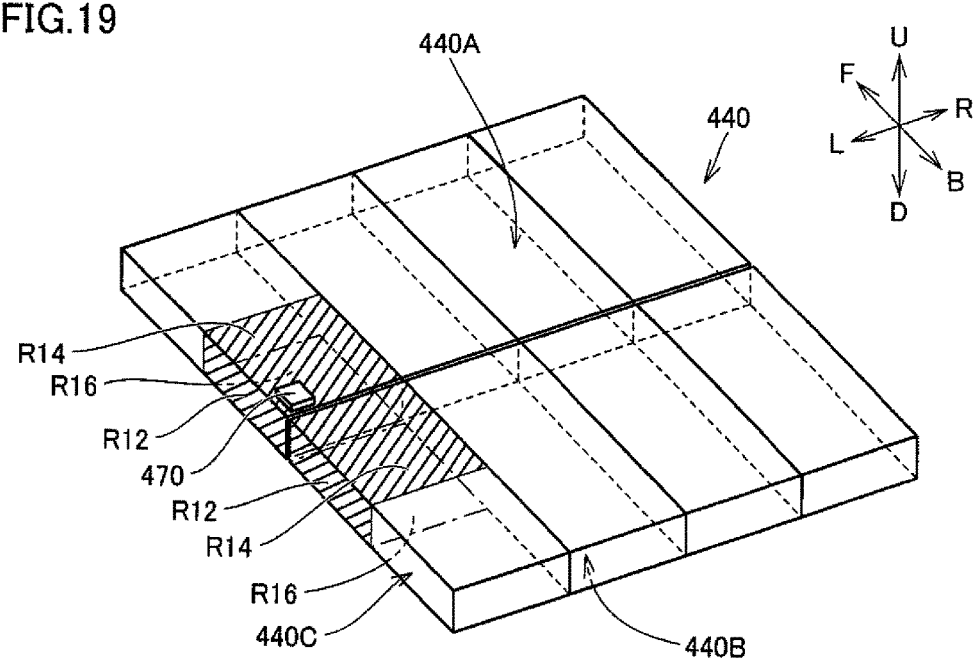
FIG. 19 is a perspective view (modification) schematically showing a core unit of the power transmission device included in the electric powered vehicle in the embodiment.
Figure 20:
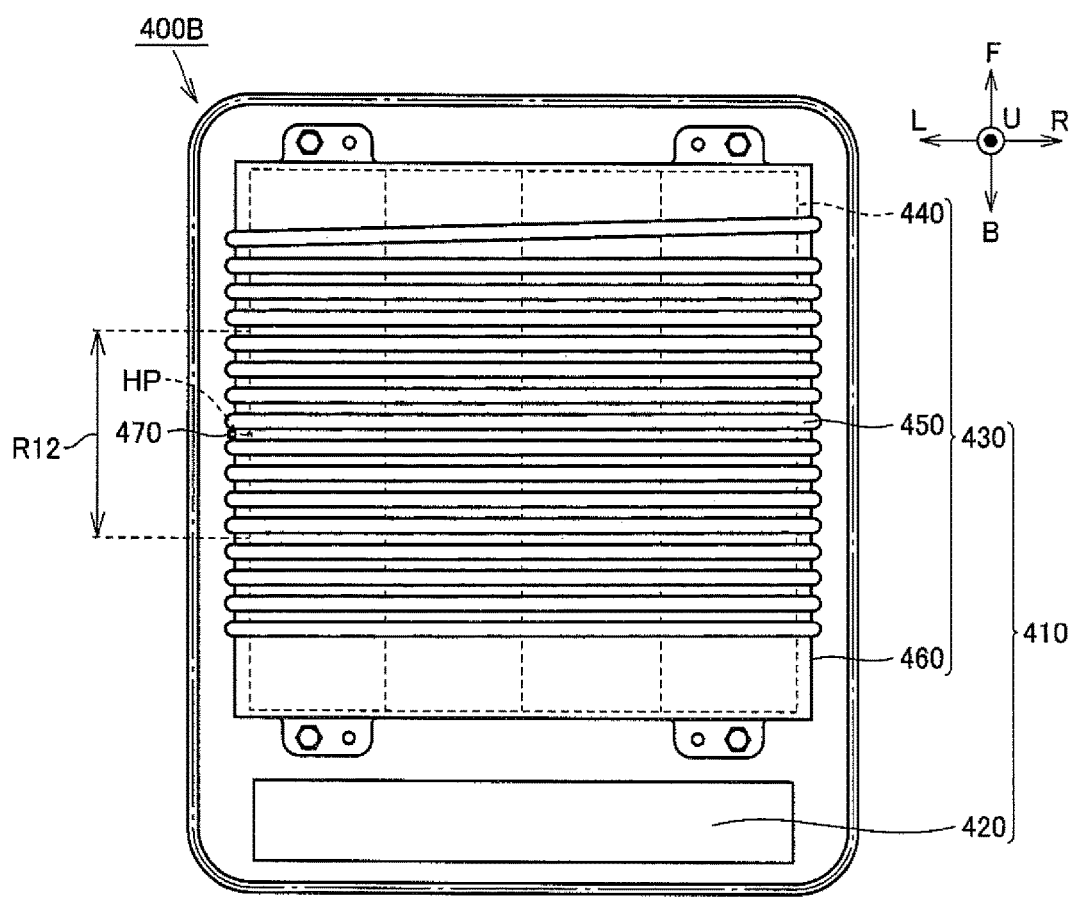
FIG. 20 is a plan view (another modification) showing the power transmission device included in the electric powered vehicle in the embodiment.

FIG. 2 is a bottom view showing electric powered vehicle 100. FIG. 3 is a cross-sectional view taken along line III-III in FIG. 2. In FIGS. 2 and 3, "D" represents a lower side D in the perpendicular direction. "L" represents a vehicle left direction L. "R" represents a vehicle right direction R. "F" represents a vehicle frontward-moving direction F. "B" represents a vehicle backward-moving direction B. "U" represents an upper side U in the perpendicular direction. These are common in below-described FIGS. 4 to 7 and FIGS. 9 to 20 as well. It is to be noted that FIGS. 18 to 20 show the power transmission device, and the left-right direction and the frontward-backward direction of the vehicle in FIGS. 18 to 20 refer to the directions corresponding to the left-right direction and the frontward-backward direction of electric powered vehicle 100 when electric powered vehicle 100 stops at the prescribed position in the parking space where power transfer is possible.

Referring to FIG. 2, vehicle main body 110 of electric powered vehicle 100 has a bottom surface 112. Bottom surface 112 refers to a visible region of vehicle main body 110 when vehicle main body 110 is viewed from a position that is distant from the ground in the direction of lower side D in the perpendicular direction, with wheels 111R, 111L, 118R, and 118L being in contact with the ground. Bottom surface 112 has a center position P1. Center position P1 is located at the center of bottom surface 112 in the frontward-backward direction (vehicle frontward-moving direction F and vehicle backward-moving direction B) of vehicle main body 110, and is located at the center of bottom surface 112 in the vehicle width direction (vehicle left direction L and vehicle right direction R) of vehicle main body 110.

Bottom surface 112 is provided with a floor panel 114, side members 115R and 115L, an exhaust pipe 116, a not-shown cross member, and the like. Floor panel 114 has a plate-like shape and separates the inside of vehicle main body 110 from the outside of vehicle main body 110. Side members 115R and 115L and the cross member are arranged on a lower surface of floor panel 114. Vehicle main body 110 includes an engine 119, and this engine 119 is arranged more frontward (on the vehicle frontward-moving direction F side) than center position P1 in the frontward-backward direction. Exhaust pipe 116 is connected to engine 119 through a catalyst 117.

(Power Reception Device 200)

Power reception device 200 is provided on bottom surface 112 of vehicle main body 110. Power reception device 200 is arranged more backward (on the vehicle backward-moving direction B side) than engine 119 in the frontward-backward direction, and more frontward (on the vehicle frontward-moving direction F side) than center position P1 in the frontward-backward direction. In order to fix power reception device 200 to bottom surface 112, power reception device 200 may be suspended from side members 115R and 115L or the cross member, or power reception device 200 may be fixed to floor panel 114.

Power reception unit 210 of power reception device 200 is housed in housing 280 having a box-like shape and is attached to bottom surface 112. As described above, coil winding axis O2 of power reception coil 250 of power reception unit 210 extends toward the direction parallel to the frontward-backward direction of vehicle main body 110. It is envisaged that coil winding axis O2 of power reception coil 250 becomes parallel to the coil winding axis of power transmission coil 450 (FIG. 1) when electric powered vehicle 100 is parked at the prescribed position in the parking space where power transfer is possible.

As shown in FIG. 3, exhaust pipe 116 is arranged within a center tunnel 114T of floor panel 114. Housing 280 of power reception device 200 is arranged below exhaust pipe 116 so as to face exhaust pipe 116 with a spacing therebetween. Air can flow between housing 280 and exhaust pipe 116. The air serves as a heat insulating layer. Therefore, for example, when charging is started after traveling, arrival of heat from exhaust pipe 116 at power reception unit 210 (coil unit 230) is suppressed even if the temperature of exhaust pipe 116 is high.

Figure 4:
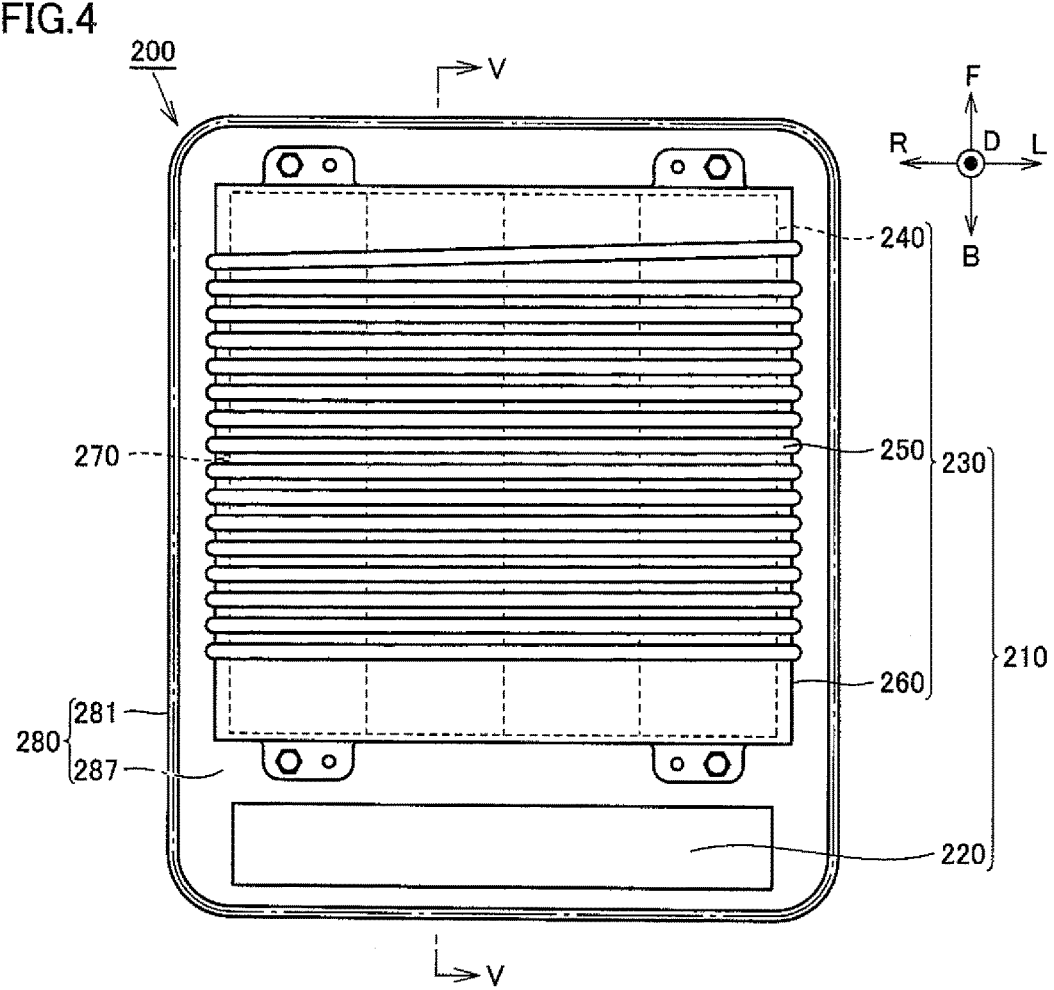
FIG. 4 is a bottom view showing a power reception device included in the electric powered vehicle in the embodiment.
Figure 5:
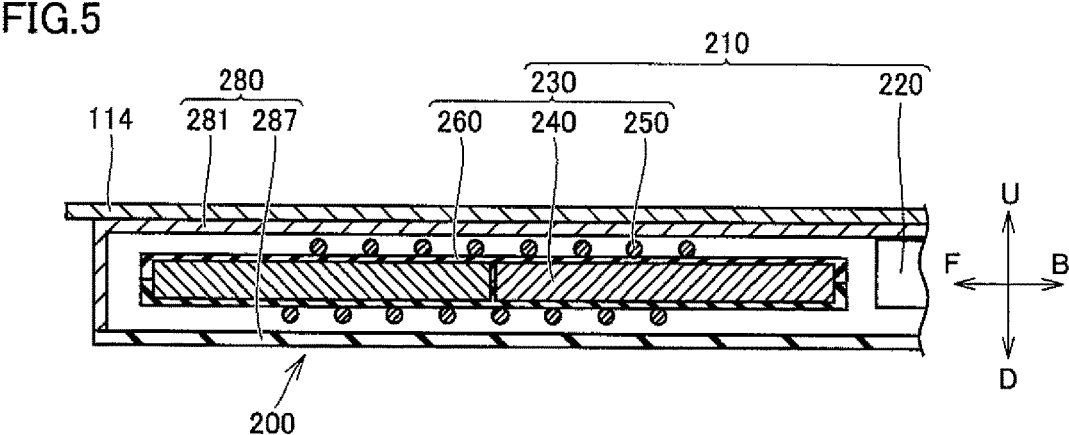
FIG. 5 is a cross-sectional view taken along line V-V in FIG. 4.

FIG. 4 is a bottom view showing power reception device 200. FIG. 5 is a cross-sectional view taken along line V-V in FIG. 4. Referring to FIGS. 4 and 5, power reception unit 210 of power reception device 200 is housed in housing 280. Housing 280 includes a housing portion 281 having a shape of being open toward the lower side, and a bottom portion 287 that closes the opening of housing portion 281 and faces power reception coil 250 from the lower side. For the sake of convenience, an outer edge of bottom portion 287 is denoted by an alternate long and short dash line in FIG. 3. Housing portion 281 is formed, for example, by a member made of metal such as copper. When a copper plate, an aluminum plate or the like having a shielding function is provided between housing portion 281 and floor panel 114, housing portion 281 may be formed by a member made of resin. Bottom portion 287 is formed by a member made of resin.

Figure 6:
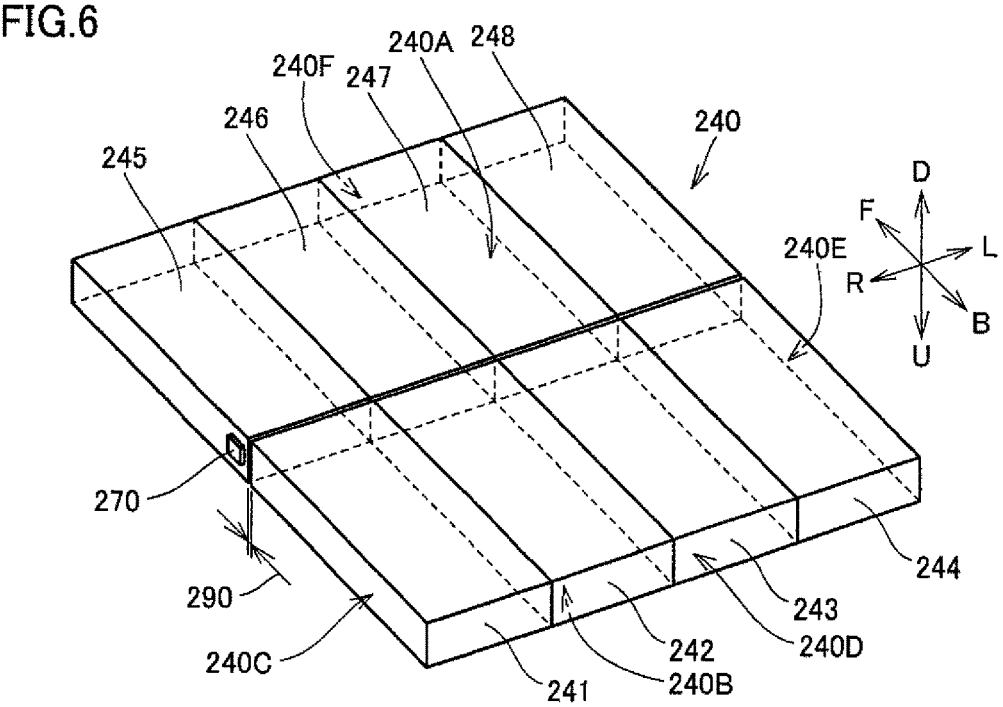
FIG. 6 is a perspective view showing a core unit of the power reception device included in the electric powered vehicle in the embodiment.

As described above, power reception unit 210 has solenoid-type coil unit 230, and capacitor 220 connected to coil unit 230. Coil unit 230 is formed by core unit 240 (refer to FIG. 6 as well) having a plate-like shape as a whole, fixing member 260 made of resin and arranged on an outer perimeter of core unit 240, and power reception coil 250 wound around the outer perimeter of fixing member 260. Core unit 240 has a plurality of divided cores 241 to 248 (FIG. 6). Fixing member 260 has a substantially rectangular parallelepiped (plate-like) outer shape as a whole. Divided cores 241 to 248 are maintained in the state of being housed in fixing member 260 and integrated by fixing member 260.

Power reception coil 250 is spirally wound around the perimeter surface of fixing member 260 to surround coil winding axis O2 (refer to FIGS. 2 and 3). More specifically, power reception coil 250 is spirally formed around core unit 240 such that, from one end of power reception coil 250 toward the other end of power reception coil 250, power reception coil 250 surrounds coil winding axis O2 and is displaced in the extending direction of coil winding axis O2 for every turn. For the sake of convenience, in FIGS. 4, 5 and the like, a spacing between the coil wires used in power reception coil 250 is shown to be wider than the actual spacing. As described above, coil winding axis O2 of power reception coil 250 has a shape of linearly extending in the direction parallel to the frontward-backward direction of vehicle main body 110.

FIG. 6 is a perspective view showing core unit 240. As described above, core unit 240 is formed by combining a plurality of divided cores 241 to 248. Divided cores 241 to 248 are formed to be rectangular parallelepiped, and have the same shape and size. Divided cores 241 to 244 are arranged in four rows along the vehicle width direction (column direction) of vehicle main body 110, and divided cores 245 to 248 are also arranged in four rows along the vehicle width direction (column direction) of vehicle main body 110.

Divided cores 241 to 244 and divided cores 245 to 248 are arranged in two rows along the vehicle frontward-backward direction, and divided cores 245 to 248 are arranged on the vehicle frontward-moving direction F side of divided cores 241 to 244 with a gap 290 between divided cores 245 to 248 and divided cores 241 to 244. A not-shown insulating plate, a not-shown insulating paper or the like is arranged in gap 290 in order to suppress a situation in which the divided cores come into contact with one another and a defect occurs. Core unit 240 is not limited to such a configuration and can be formed by a plurality of divided cores arranged in the row direction and/or in the column direction. When the plurality of divided cores are used to form core unit 240, the number of division in the extending direction of the coil winding axis is preferably smaller than the number of division in the direction orthogonal to the extending direction of the coil winding axis as in the present embodiment.

Core unit 240 has a plate-like shape as a whole, and an upper surface 240A is formed on upper side U in the perpendicular direction, and a lower surface 240B is formed on lower side D in the perpendicular direction. A side surface 240C is formed on the vehicle right direction R side, and a side surface 240D is formed on the vehicle backward-moving direction B side. A side surface 240E is formed on the vehicle left direction L side, and a side surface 240F is formed on the vehicle frontward-moving direction F side. Namely, core unit 240 includes upper surface 240A, lower surface 240B and side surfaces 240C to 240F as outer surfaces.

Temperature measuring unit 270 disposed on side surface 240C for measuring the temperature of core unit 240 is directly affixed to a side surface of divided core 241 so as to be in contact with a portion of divided core 245 close to divided core 241. The details about the arrangement position of temperature measuring unit 270 will be described below with reference to FIGS. 10 to 15. Any temperature measuring unit can be used as temperature measuring unit 270 as long as it can detect the temperature of core unit 240. An example includes electrical measurement by a thermistor, electrical measurement by a thermocouple, or mechanical measurement by a bimetal or a shape-memory alloy.

(Function and Effect)

Referring again to FIG. 1, when power transfer is performed between power reception unit 210 and power transmission unit 410, core unit 240 and core unit 440 are arranged to face each other, and the AC current having a prescribed frequency is supplied to power transmission coil 450. An electromagnetic field that vibrates at the prescribed frequency is formed around power transmission coil 450. A magnetic flux formed in the electromagnetic field has a so-called arched shape and passes through each of core units 240 and 440. Power reception coil 250 receives the electric power through this electromagnetic field.

Figure 7:
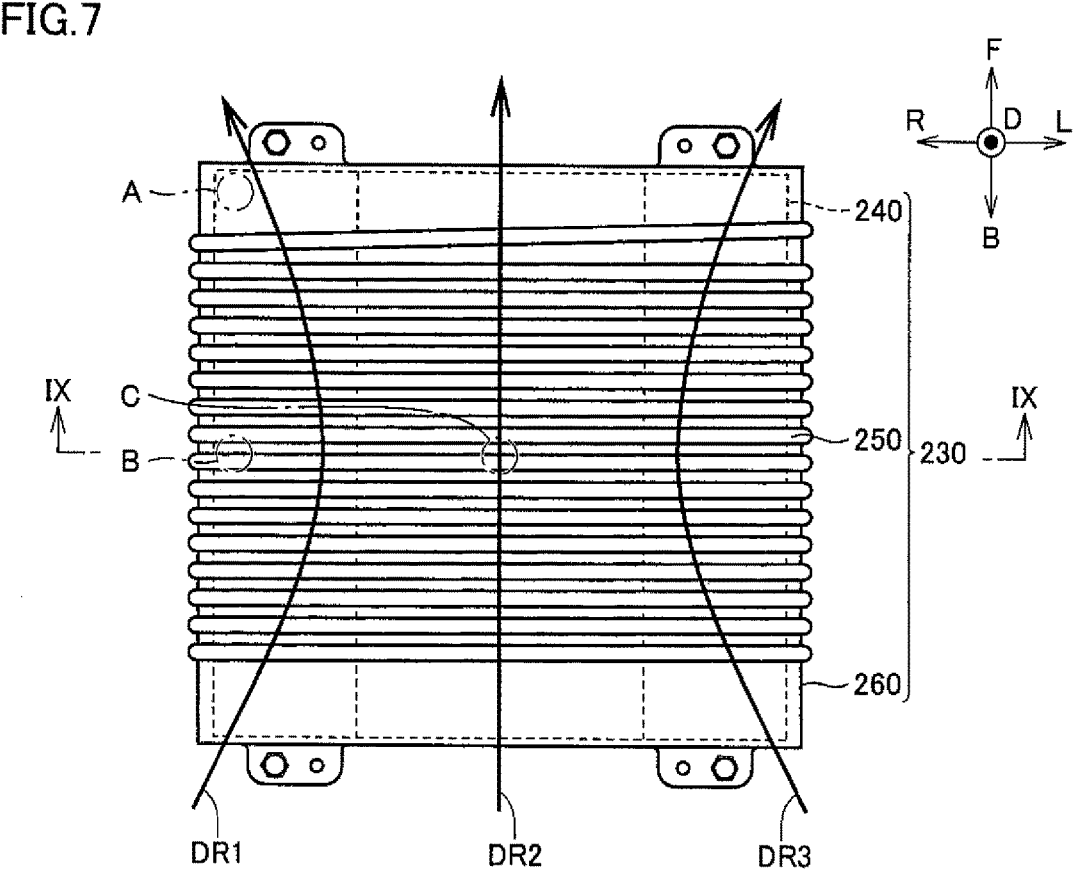
FIG. 7 is a bottom view showing a coil unit during power transfer in the power reception device in the embodiment.

FIG. 7 is a bottom view showing coil unit 230 during power transfer. During power transfer, the magnetic flux passes through coil unit 230 from a portion of coil unit 230 on the vehicle backward-moving direction B (vehicle frontward-moving direction F) side to a portion of coil unit 230 on the vehicle frontward-moving direction F (vehicle backward-moving direction B) side, as shown by arrows DR1, DR2 and DR3.

Figure 8:
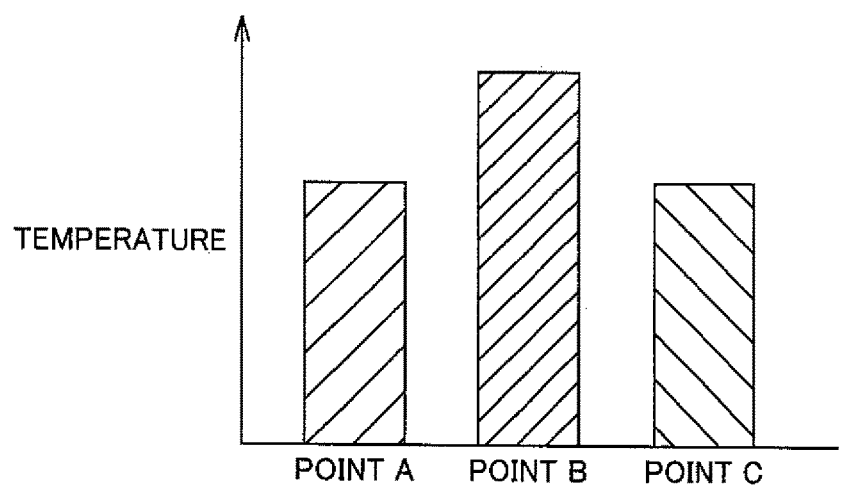
FIG. 8 is a diagram showing temperature distribution at a point A, a point B and a point C shown in FIG. 7.

FIG. 8 shows temperature distribution at a point A, a point B and a point C shown in FIG. 7. Point A in FIG. 7 refers to a portion of core unit 240 located on the vehicle frontward-moving direction F side and on the vehicle right direction R side. Power reception coil 250 is not wound around point A. Point B refers to a portion located on the vehicle frontward-moving direction F side and at the center in the vehicle frontward-backward direction (vehicle frontward-moving direction F and vehicle backward-moving direction B). Power reception coil 250 is wound around point B. Point C refers to a portion located at the center in the vehicle width direction (vehicle left direction L and vehicle right direction R) and at the center in the vehicle frontward-backward direction (vehicle frontward-moving direction F and vehicle backward-moving direction B). Power reception coil 250 is also wound around point C.

Figure 9:
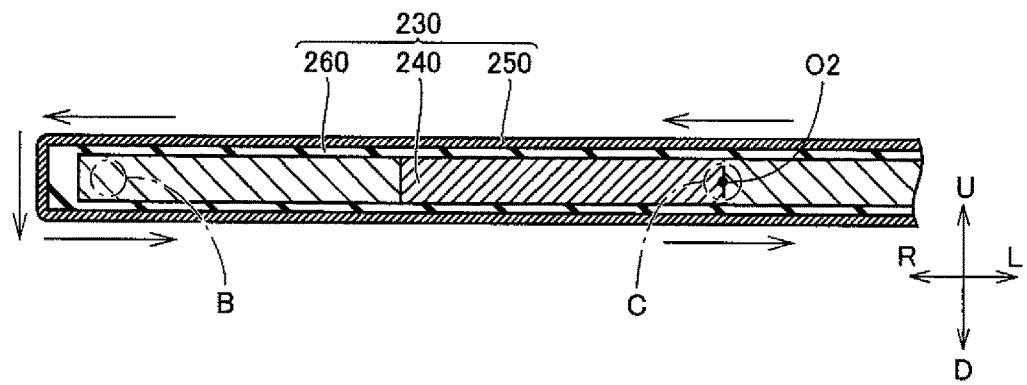
FIG. 9 is a cross-sectional view taken along line IX-IX in FIG. 7.

FIG. 9 is a cross-sectional view taken along line IX-IX in FIG. 7. As shown in FIG. 9, when power reception coil 250 is so-called solenoid-type coil unit 230 wound around plate-like core unit 240, the magnetic flux is generated at point C from the current flowing along the two surfaces, i.e., the upper and lower surfaces, whereas the magnetic flux is generated at point B from the current flowing along the three surfaces, i.e., the upper and lower surfaces and the side surface. Namely, in core unit 240, the magnetic flux is likely to concentrate most on point B and heat generation at point B is the largest as shown in FIG. 8.

As described in the beginning, when the temperature of the core exceeds the allowable value, the loss increases, and the power transfer efficiency decreases or power reception coil 250 and the like arranged around the core are affected. Therefore, in order to prevent the temperature of the core from exceeding the allowable value, it is desirable to measure the temperature of, particularly, point B whose temperature becomes the highest in the high-temperature portion of the core, and control the temperature of core unit 240 based on the temperature of point B.

As described above with reference to FIG. 6, in the present embodiment, temperature measuring unit 270 for measuring the temperature of core unit 240 is affixed to the portion of divided core 245 close to divided core 241 on side surface 240C. Since the portion of divided core 245 close to divided core 241 is close to a portion corresponding to aforementioned point B, temperature measuring unit 270 can measure the temperature of the high-temperature portion of core unit 240 more accurately than conventional. Temperature measuring unit 270 is preferably arranged as close to the portion corresponding to aforementioned point B as possible.

In the present embodiment, temperature measuring unit 270 is directly affixed to the side surface of divided core 241 so as to be in contact with the portion of divided core 245 close to divided core 241. As long as temperature measuring unit 270 is arranged to face point B or the high-temperature portion therearound, temperature measuring unit 270 does not necessarily need to be directly affixed to the side surface of divided core 241, and may be arranged, for example, on an outer surface of fixing member 260.

Information about the temperature measured by temperature measuring unit 270 is sent to vehicle ECU 120 (FIG. 1). For example, when vehicle ECU 120 determines that the temperature measured by temperature measuring unit 270 is equal to or higher than a predetermined threshold value, vehicle ECU 120 transmits a signal for causing power transmission device 400 to stop power transmission to power transmission ECU 320 through communication units 180 and 322 (FIG. 1). When vehicle ECU 120 determines that the temperature measured by temperature measuring unit 270 is lower than the predetermined threshold value, vehicle ECU 120 may transmit a signal for causing power transmission device 400 to start (restart) or continue power transmission to power transmission ECU 320 through communication units 180 and 322 (FIG. 1).

When vehicle ECU 120 determines that the temperature measured by temperature measuring unit 270 is equal to or higher than the predetermined threshold value, vehicle ECU 120 may transmit a signal for causing power transmission device 400 to reduce the transmitted electric power to power transmission ECU 320 through communication units 180 and 322 (FIG. 1). In this case, when vehicle ECU 120 determines that the temperature measured by temperature measuring unit 270 is lower than the predetermined threshold value, vehicle ECU 120 may transmit a signal for causing power transmission device 400 to increase the transmitted electric power to power transmission ECU 320 through communication units 180 and 322 (FIG. 1).

(Arrangement Position of Temperature Measuring Unit 270)

Figure 10:
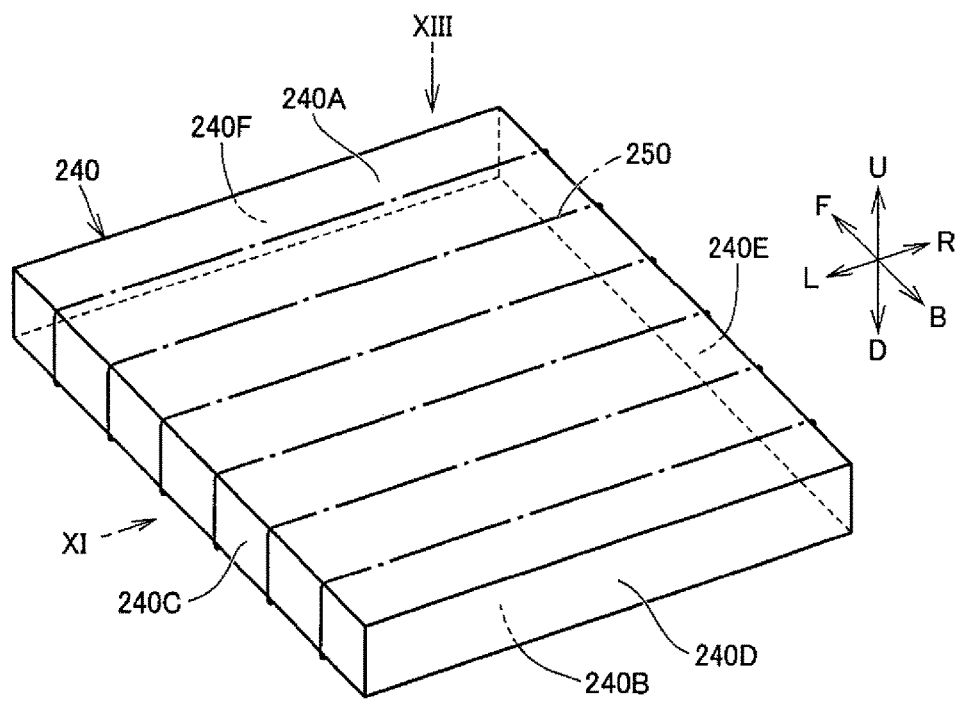
FIG. 10 is a perspective view schematically showing the core unit of the power reception device included in the electric powered vehicle in the embodiment.

The arrangement position of temperature measuring unit 270 will be described with reference to FIGS. 10 to 15. FIG. 10 is a perspective view schematically showing core unit 240 used in the power reception device. As shown in FIG. 10, core unit 240 has a rectangular parallelepiped shape. Upper surface 240A is formed on upper side U in the perpendicular direction, and lower surface 240B is formed on lower side D in the perpendicular direction. Side surface 240C is formed on the vehicle right direction R side, and side surface 240D is formed on the vehicle backward-moving direction B side. Side surface 240E is formed on the vehicle left direction L side, and side surface 240F is formed on the vehicle frontward-moving direction F side. For the sake of convenience in description, FIG. 10 shows a state in which power reception coil 250 is directly wound around core unit 240. Actually, however, power reception coil 250 is wound around fixing member 260 (not shown in FIG. 10) as described above. This is common in FIGS. 11 and 13 as well.

(Side Surface Wound Portion R1 and Center Portion HP)

Figure 11:
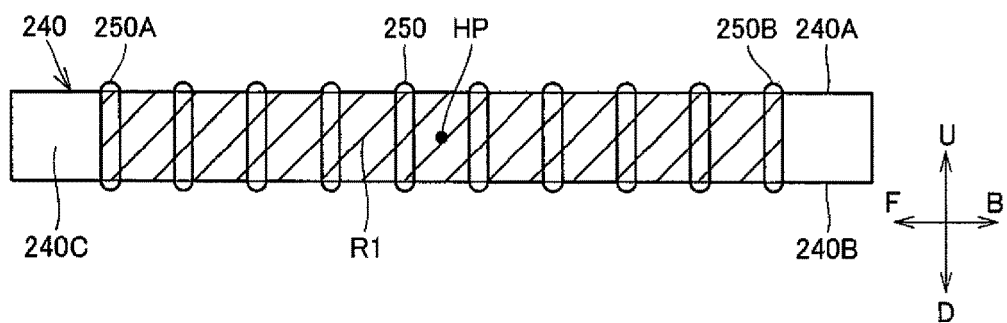
FIG. 11 is a side view of the core unit and a power reception coil of the power reception device included in the electric powered vehicle in the embodiment, and shows a state when they are viewed from the direction of an arrow XI in FIG. 10.

FIG. 11 is a side view of core unit 240 and power reception coil 250, and shows a state when they are viewed from the direction of an arrow XI in FIG. 10. Referring to FIG. 11, it is assumed that a side surface wound portion R1 refers to a portion of side surface 240C of core unit 240 around which power reception coil 250 is wound, Side surface wound portion R1 refers to a partial region of side surface 240C (region indicated by oblique-line hatching in the figure), which is surrounded by a portion of side surface 240C that faces a coil portion 250A located on the most frontward side, in vehicle frontward-moving direction F, of power reception coil 250 wound around core unit 240, and a portion of side surface 240C that faces a coil portion 250B located on the most backward side, in vehicle backward-moving direction B, of power reception coil 250 wound around core unit 240.

Side surface 240C has a center portion HP. Center portion HP refers to a portion located at the center of side surface wound portion R1 in the extending direction of the coil winding axis and at the center of core unit 240 in the thickness direction. Temperature measuring unit 270 for measuring the temperature of core unit 240 is provided in a high-temperature region including center portion HP and a portion around center portion HP. The portion around center portion HP herein refers to, for example, a region including a peripheral region R2 (described below with reference to FIG. 12) of side surface 240C located on the periphery of center portion HP, an upper surface adjacent region R4 (described below with reference to FIG. 14) of upper surface 240A adjacent to peripheral region R2, and a lower surface adjacent region R6 (described below with reference to FIG. 15) of lower surface 240B adjacent to peripheral region R2.

(Peripheral Region R2)

Figure 12:
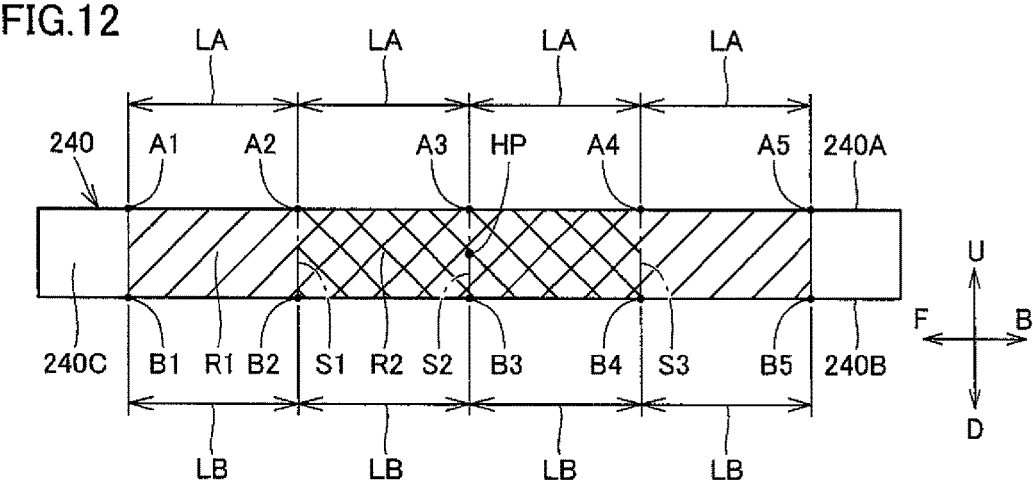
FIG. 12 is a side view schematically showing the core unit of the power reception device included in the electric powered vehicle in the embodiment.

FIG. 12 is a side view schematically showing core unit 240, which is obtained by removing power reception coil 250 from the configuration shown in FIG. 11. Peripheral region R2 of side surface 240C located on the periphery of center portion HP refers to a region closer to center portion HP in the extending direction of coil winding axis O2 (not shown) than one end (coil portion 250A) of the portion in which power reception coil 250 is wound around the fixing member (side surface 240C), and closer to center portion HP in the extending direction of coil winding axis O2 (not shown) than the other end (coil portion 250B) of the portion in which power reception coil 250 is wound around the fixing member (side surface 240C). Peripheral region R2 is defined as follows, for example. Heat in core unit 240 is easily released to the outside from a portion of core unit 240 protruding from power reception coil 250, and heat in a portion located closer to the end side of core unit 240 than peripheral region R2 is released to the outside with comparative ease. On the other hand, peripheral region R2 is distant from the portion protruding from power reception coil 250, and thus, the temperature of peripheral region R2 is likely to become high. As can be seen from the foregoing, it is preferable to provide temperature measuring unit 270 in peripheral region R2.

It is assumed that a point A1 refers to an end of side surface wound portion R1 in vehicle frontward-moving direction F adjacent to upper surface 240A, and a point A5 refers to an end of side surface wound portion R1 in vehicle backward-moving direction B adjacent to upper surface 240A. By equally dividing a dimension defined by point A1 and point A5 into four sections, points A2, A3 and A4 are obtained between point A1 and point A5. A spacing between points A1 and A2, a spacing between points A2 and A3, a spacing between points A3 and A4, and a spacing between points A4 and A5 have the same dimension LA.

It is assumed that a point B1 refers to an end of side surface wound portion R1 in vehicle frontward-moving direction F adjacent to lower surface 240B, and a point B5 refers to an end of side surface wound portion R1 in vehicle backward-moving direction B adjacent to lower surface 240B. By equally dividing a dimension defined by point B1 and point B5 into four sections, points B2, B3 and B4 are obtained between point B1 and point B5. A spacing between points B1 and B2, a spacing between points B2 and B3, a spacing between points B3 and B4, and a spacing between points B4 and B5 have the same dimension LB. In the present embodiment, dimension LA and dimension LB have the same value.

By connecting point A2 and point B2, a line segment S1 is drawn. By connecting point A3 and point B3, a line segment S2 is drawn. By connecting point A3 and point B3, a line segment S3 is drawn. Peripheral region R2 of side surface 240C located on the periphery of center portion HP refers to a region of side surface 240C located between line segment S1 and line segment S3 (region indicated by cross hatching enclosed by connecting points A2, A4, B2, and B4). Namely, peripheral region R2 refers to two regions located on the inner side, of four regions of side surface wound portion R1 formed by virtually equally dividing side surface wound portion R1 into four sections to have the same length in the extending direction of the coil winding axis. In the present embodiment, peripheral region R2 has a rectangular shape.

(Upper Surface Wound Portion R3)

Figure 13:
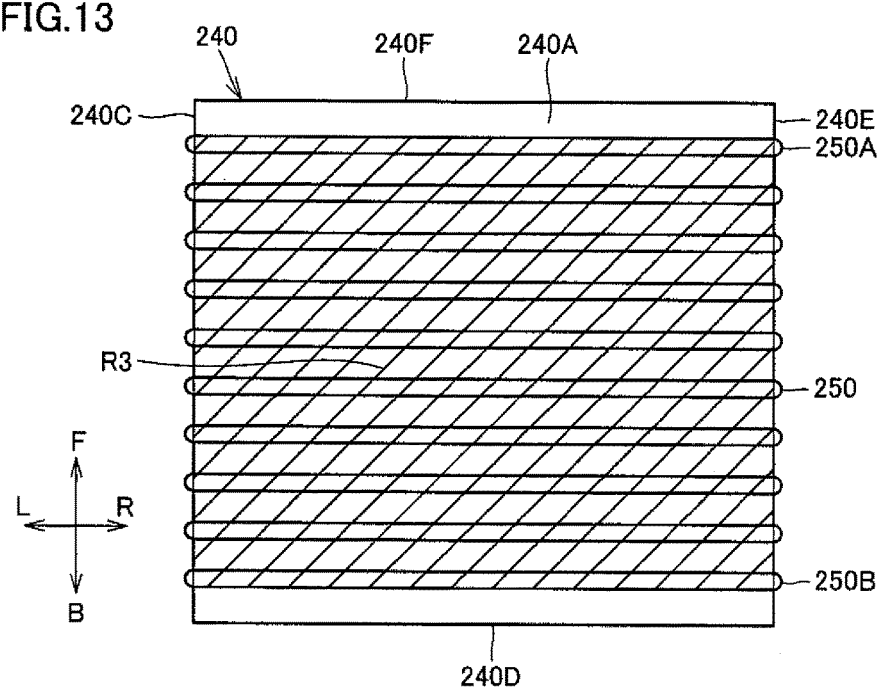
FIG. 13 is a plan view of the core unit and the power reception coil of the power reception device included in the electric powered vehicle in the embodiment, and shows a state when they are viewed from the direction of an arrow XIII in FIG. 10.

FIG. 13 is a top view of core unit 240 and power reception coil 250, and shows a state when they are viewed from the direction of an arrow XIII in FIG. 10. Referring to FIG. 13, it is assumed that an upper surface wound portion R3 refers to a portion of upper surface 240A of core unit 240 around which power reception coil 250 is wound. Upper surface wound portion R3 refers to a partial region of upper surface 240A (region indicated by an oblique line in the figure), which is surrounded by a portion of upper surface 240A that faces coil portion 250A located on the most frontward side, in vehicle frontward-moving direction F, of power reception coil 250 wound around core unit 240, and a portion of upper surface 240A that faces coil portion 250B located on the most backward side, in vehicle backward-moving direction B, of power reception coil 250 wound around core unit 240.

(Upper Surface Adjacent Region R4)

Figure 14:
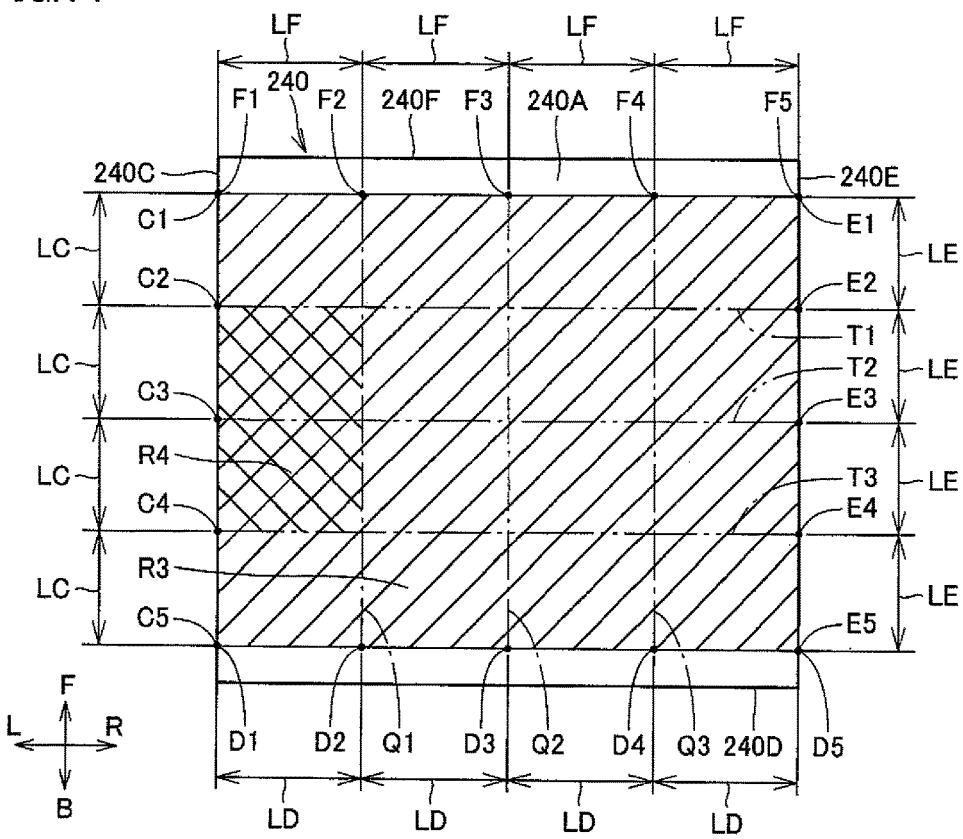
FIG. 14 is a plan view schematically showing the core unit of the power reception device included in the electric powered vehicle in the embodiment.

FIG. 14 is a plan view schematically showing core unit 240, which is obtained by removing power reception coil 250 from the configuration shown in FIG. 13. Upper surface adjacent region R4 of upper surface 240A adjacent to, peripheral region R2 (FIG. 12) refers to a region located at a position closer to side surface 240C of core unit 240 than coil winding axis O2 (not shown) in the direction orthogonal to coil winding axis O2. In the center portion of upper surface 240A, the temperature of the core rises due to the magnetic flux from the coil wire located on upper surface 240A and the coil wire located on lower surface 240B. On the other hand, in side surface 240C, the temperature of the core becomes high due to the magnetic flux from the coil wire located on upper surface 240A, lower surface 240B and side surface 240C.

Therefore, it can be seen that, in upper surface 240A, the nearer the side surface 240C side, the higher the temperature. Particularly, upper surface adjacent region R4 is adjacent to peripheral region R2 whose temperature becomes high, and thus, the temperature of upper surface adjacent region R4 is likely to become high. Therefore, it can be seen that when temperature measuring unit 270 is arranged on upper surface 240A, it is preferable to arrange temperature measuring unit 270 in upper surface adjacent region R4. In this case, temperature measuring unit 270 may be directly affixed to the divided core located in upper surface adjacent region R4, or may be provided on a surface of the fixing member that faces upper surface adjacent region R4. Upper surface adjacent region R4 is defined as follows, for example.

It is assumed that a point C1 refers to an end of upper surface wound portion R3 in vehicle frontward-moving direction F adjacent to side surface 240C, and a point C5 refers to an end of upper surface wound portion R3 in vehicle backward-moving direction B adjacent to side surface 240C. By equally dividing a dimension defined by point C1 and point C5 into four sections, points C2, C3 and C4 are obtained between point C1 and point C5. A spacing between points C1 and C2, a spacing between points C2 and C3, a spacing between points C3 and C4, and a spacing between points C4 and C5 have the same dimension LC.

It is assumed that a point E1 refers to an end of upper surface wound portion R3 in vehicle frontward-moving direction F adjacent to side surface 240E, and a point E5 refers to an end of upper surface wound portion R3 in vehicle backward-moving direction B adjacent to side surface 240E. By equally dividing a dimension defined by point E1 and point E5 into four sections, points E2, E3 and E4 are obtained between point E1 and point E5. A spacing between points E1 and E2, a spacing between points E2 and E3, a spacing between points E3 and E4, and a spacing between points E4 and E5 have the same dimension LE. In the present embodiment, dimension LC and dimension LE have the same value.

It is assumed that a point F1 refers to an end of upper surface wound portion R3 in vehicle frontward-moving direction F adjacent to side surface 240C, and a point F5 refers to an end of upper surface wound portion R3 in vehicle frontward-moving direction F adjacent to side surface 240E. Point F1 corresponds to point C1 and point F5 corresponds to point E1. By equally dividing a dimension defined by point F1 and point F5 into four sections, points F2, F3 and F4 are obtained between point F1 and point F5. A spacing between points F1 and F2, a spacing between points F2 and F3, a spacing between points F3 and F4, and a spacing between points F4 and F5 have the same dimension LF.

It is assumed that a point D1 refers to an end of upper surface wound portion R3 in vehicle backward-moving direction B adjacent to side surface 240C, and a point D5 refers to an end of upper surface wound portion R3 in vehicle backward-moving direction B adjacent to side surface 240E. Point D1 corresponds to point C5 and point D5 corresponds to point E5. By equally dividing a dimension defined by point D1 and point D5 into four sections, points D2, D3 and D4 are obtained between point D1 and point D5. A spacing between points D1 and D2, a spacing between points D2 and D3, a spacing between points D3 and D4, and a spacing between points D4 and D5 have the same dimension LD. In the present embodiment, dimension LF and dimension LD have the same value.

By connecting point F2 and point D2, a line segment Q1 is drawn. By connecting point F3 and point D3, a line segment Q2 is drawn. By connecting point F4 and point D4, a line segment Q3 is drawn. By connecting point C2 and point E2, a line segment T1 is drawn. By connecting point C3 and point E3, a line segment T2 is drawn. By connecting point C4 and point E4, a line segment T3 is drawn. Upper surface adjacent region R4 of upper surface 240A adjacent to peripheral region R2 (FIG. 12) refers to a region of upper surface 240A enclosed by a line segment connecting points F1 and D1, line segment Q1, line segment T1, and line segment T3 (region indicated by cross hatching in the figure).

Namely, assuming that upper surface wound portion R3 refers to the portion of upper surface 240A of core unit 240 around which power reception coil 250 is wound, and an inner region (region enclosed by connecting points C2, C4, E4, and E2) refers to two regions located on the inner side, of four regions of upper surface wound portion R3 formed by virtually equally dividing upper surface wound portion R3 into four sections to have the same length in the extending direction of coil winding axis O2 (not shown), upper surface adjacent region R4 refers to one of two regions located on the outer side, of four regions of this inner region formed by virtually equally dividing the inner region into four sections to have the same length in the direction orthogonal to the extending direction of coil winding axis O2. Namely, upper surface adjacent region R4 may be located on the side surface 240C side, or may be located on the side surface 240E side.

(Lower Surface Adjacent Region R6)

Figure 15:
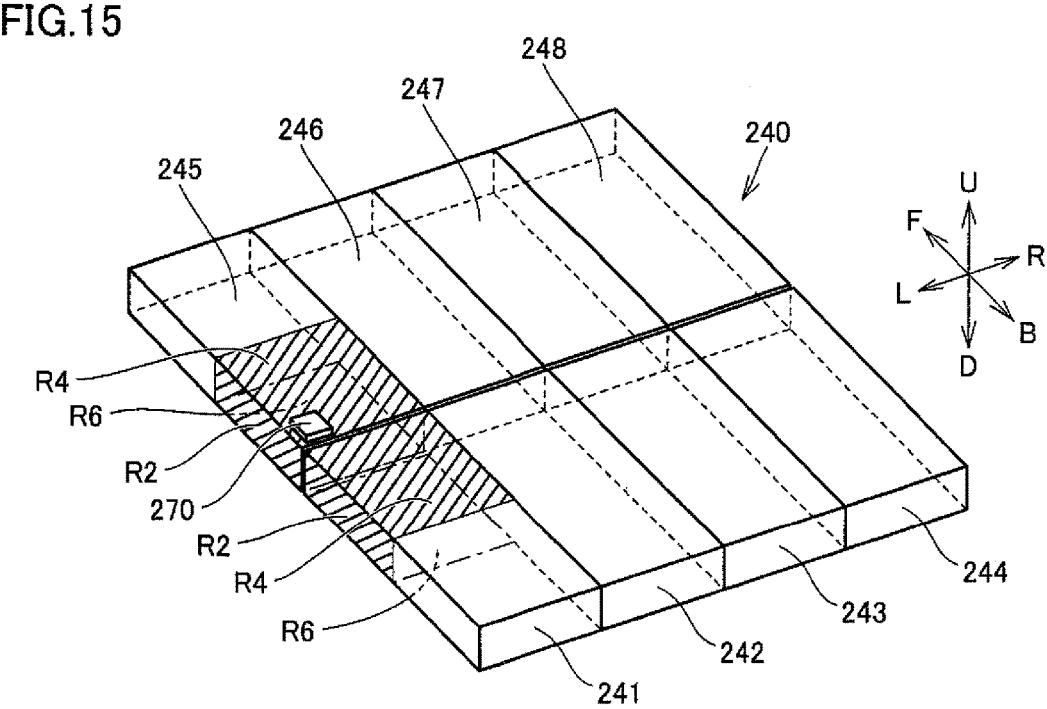
FIG. 15 is another perspective view schematically showing the core unit of the power reception device included in the electric powered vehicle in the embodiment.

FIG. 15 is another perspective view schematically showing core unit 240 used in the power reception device. It is assumed that a lower surface wound portion refers to a portion of lower surface 240B of core unit 240 around which power reception coil 250 is wound. The lower surface wound portion refers to a region surrounded by a portion of lower surface 240B that faces the coil portion (coil portion 250A) located on the most frontward side, in vehicle frontward-moving direction F, of power reception coil 250 wound around core unit 240, and a portion of lower surface 240B that faces the coil portion (coil portion 250B) located on the most backward side, in vehicle backward-moving direction B, of power reception coil 250 wound around core unit 240.

Lower surface adjacent region R6 (FIG. 15) of lower surface 240B adjacent to peripheral region R2 (FIG. 12) refers to a region located at a position closer to side surface 240C of core unit 240 than coil winding axis O2 (not shown) in the direction orthogonal to coil winding axis O2. In the center portion of lower surface 240B, the temperature of the core rises due to the magnetic flux from the coil wire located on lower surface 240B and the coil wire located on upper surface 240A. On the other hand, in side surface 240C, the temperature of the core becomes high due to the magnetic flux from the coil wire located on upper surface 240A, lower surface 240B and side surface 240C.

Therefore, it can be seen that, in lower surface 240B, the nearer the side surface 240C side, the higher the temperature. Particularly, lower surface adjacent region R6 is adjacent to peripheral region R2 whose temperature becomes high, and thus, the temperature of lower surface adjacent region R6 is likely to become high. Therefore, it can be seen that when temperature measuring unit 270 is arranged on lower surface 240B, it is preferable to arrange temperature measuring unit 270 in lower surface adjacent region R6. In this case, temperature measuring unit 270 may be directly affixed to the divided core located in lower surface adjacent region R6, or may be provided on a surface of the fixing member that faces lower surface adjacent region R6.

Lower surface adjacent region R6 can be defined similarly to upper surface adjacent region R4. Namely, assuming that the lower surface wound portion refers to the portion of lower surface 240B of core unit 240 around which power reception coil 250 is wound, and an inner region refers to two regions located on the inner side, of four regions of the lower surface wound portion formed by virtually equally dividing the lower surface wound portion into four sections to have the same length in the extending direction of coil winding axis O2 (not shown), lower surface adjacent region R6 refers to one of two regions located on the outer side, of four regions of this inner region formed by virtually equally dividing the inner region into four sections to have the same length in the direction orthogonal to the extending direction of coil winding axis O2. Namely, lower surface adjacent region R6 may be located on the side surface 240C side, or may be located on the side surface 240E side.

In the present embodiment, temperature measuring unit 270 for measuring the temperature of core unit 240 is arranged to face center portion HP (FIG. 12), or is arranged to face any one of peripheral region R2 (FIG. 12) of side surface 240C located on the periphery of center portion HP, upper surface adjacent region R4 (FIG. 14) of upper surface 240A adjacent to peripheral region R2, and lower surface adjacent region R6 (FIG. 15) of lower surface 240B adjacent to peripheral region R2. Since temperature measuring unit 270 is close to center portion HP (portion whose temperature is likely to become the highest) described with reference to FIG. 11, temperature measuring unit 270 can measure the temperature of the high-temperature portion of core unit 240 more accurately than conventional.

FIG. 15 shows such a configuration that temperature measuring unit 270 is arranged to face upper surface adjacent region R4 of core unit 240. When power reception device 200 is arranged below exhaust pipe 116, the upper surface 240A side of core unit 240 is more likely to become hot than the other portions. Therefore, temperature measuring unit 270 is arranged to face upper surface adjacent region R4 (a part of the upper surface of core unit 240), and thereby, the temperature of the high-temperature portion of core unit 240 can be accurately measured.

[Modification]

Figure 16:
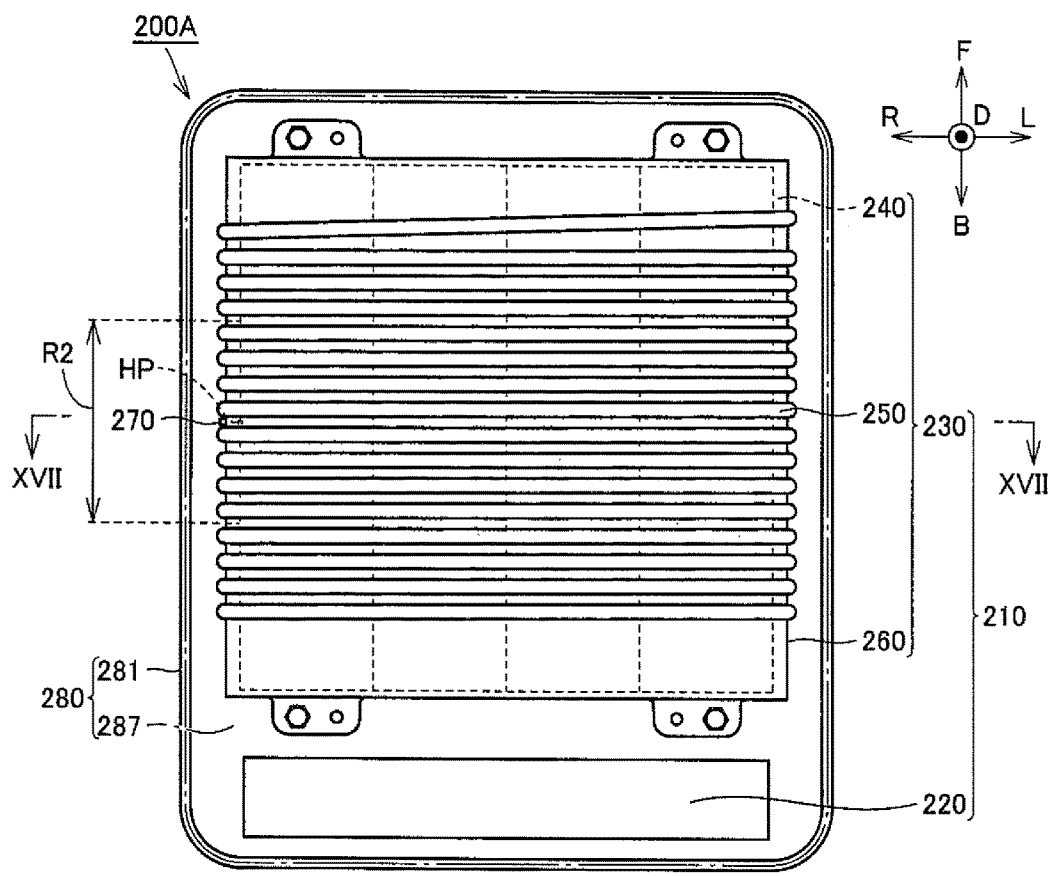
FIG. 16 is a bottom view showing a modification of the power reception device included in the electric powered vehicle in the embodiment.

A power reception device 200A as a modification of the aforementioned embodiment will be described with reference to FIGS. 16 and 17. FIG. 16 is a plan view showing power reception device 200A, and FIG. 17 is a cross-sectional view taken along line XVII-XVII in FIG. 16.

Figure 17:
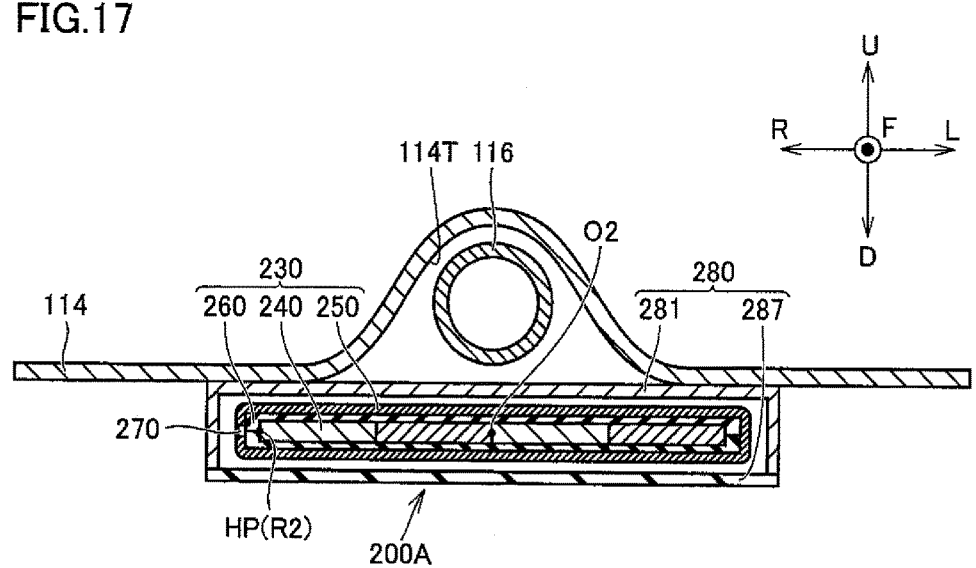
FIG. 17 is a cross-sectional view taken along line XVII-XVII in FIG. 16.

As shown in FIGS. 16 and 17, temperature measuring unit 270 of power reception device 200A is provided on the perimeter surface (on the outer surface) of fixing member 260 and is provided at a position facing peripheral region R2. Particularly, temperature measuring unit 270 in this modification is provided at a position facing center portion HP of core unit 240 with fixing member 260 interposed therebetween.

Since temperature measuring unit 270 is provided at the position facing peripheral region R2 as described above, the temperature of the region whose temperature becomes high can be accurately detected. Particularly in this modification, temperature measuring unit 270 is provided at the position facing center portion HP of core unit 240 whose temperature becomes the highest, and thus, the temperature of center portion HP can be measured more accurately. Furthermore, temperature measuring unit 270 is arranged on the perimeter surface of fixing member 260, and thus, temperature measuring unit 270 can be easily arranged during the manufacturing process, which leads to simplification of the manufacturing process. Even when the need to replace temperature measuring unit 270 arises, the replacement work can be easily performed.

In the example shown in FIGS. 16 and 17, temperature measuring unit 270 is provided at the position facing peripheral region R2. However, the arrangement position is not limited to this position. For example, temperature measuring unit 270 may be provided on the perimeter surface of fixing member 260 and provided at a position facing upper surface adjacent region R4 or lower surface adjacent region R6. In this case, temperature measuring unit 270 faces each of the aforementioned regions, with fixing member 260 interposed therebetween.

Temperature measuring unit 270 is arranged as described above, and thereby, the temperature of upper surface adjacent region R4 or lower surface adjacent region R6 of core unit 240 whose temperature becomes high can be detected. Namely, temperature measuring unit 270 may only be provided at the position facing the high-temperature region on the perimeter surface of fixing member 260. The high-temperature region refers to a region including center portion HP and a portion around center portion HP as described above. The portion around center portion HP refers to a region including peripheral region R2 (FIG. 12) of the side surface of core unit 240 located on the periphery of center portion HP, upper surface adjacent region R4 (FIG. 14) of the upper surface of core unit 240 adjacent to peripheral region R2, and lower surface adjacent region R6 (FIG. 15) of the lower surface of core unit 240 adjacent to peripheral region R2.

In the aforementioned embodiment, the arrangement position of temperature measuring unit 270 used in power reception device 200 has been described in detail. The same as the aforementioned technical idea is also applicable to temperature measuring unit 470 used in power transmission device 400.

Referring to FIG. 18, in a power transmission device 400A, temperature measuring unit 470 for measuring the temperature of core unit 440 is directly affixed to a surface of a core and is provided at a position facing center portion HP. Center portion HP herein can be defined similarly to the case described above with reference to FIG. 11. Namely, assuming that a side surface wound portion refers to a portion of a side surface of core unit 440 around which power transmission coil 450 is wound, center portion HP refers to a portion located at the center of this side surface wound portion in the extending direction of the coil winding axis and at the center of core unit 440 in the thickness direction. The present invention is not limited to this configuration, and temperature measuring unit 470 may only be provided at a position facing a high-temperature region. The high-temperature region refers to a region including center portion HP and a portion around center portion HP.

Referring to FIG. 19, the portion around center portion HP herein can be defined similarly to the case described above with reference to FIGS. 10 to 15. Namely, the portion around center portion HP refers to a region including a peripheral region R12 of a side surface 440C of core unit 440 located on the periphery of center portion HP, an upper surface adjacent region R14 of an upper surface 440A of core unit 440 adjacent to peripheral region R12, and a lower surface adjacent region R16 of a lower surface 440B of core unit 440 adjacent to peripheral region R12. Peripheral region R12 corresponds to peripheral region R2 (FIG. 12) in the case of the power reception device, upper surface adjacent region R14 corresponds to upper surface adjacent region R4 (FIG. 14) in the case of the power reception device, and lower surface adjacent region R16 corresponds to lower surface adjacent region R6 (FIG. 15) in the case of the power reception device.

Referring to FIG. 20, like a power transmission device 400B, temperature measuring unit 470 may be provided at a position facing a high-temperature region on a perimeter surface of a fixing member 460. Temperature measuring unit 470 is arranged on the perimeter surface of fixing member 460, and thus, temperature measuring unit 470 can be easily arranged during the manufacturing process, which leads to simplification of the manufacturing process. Even when the need to replace temperature measuring unit 470 arises, the replacement work can be easily performed.

Although the embodiment of the present invention has been described, it should be understood that the embodiment disclosed herein is illustrative and not limitative in any respect. The scope of the present invention is defined by the terms of the claims, and is intended to include any modifications within the scope and meaning equivalent to the terms of the claims.

What is claimed is:

1. A power reception device that is mounted on a vehicle and receives electric power in a contactless manner from a power transmission device having a power transmission coil, with the power reception device facing the power transmission device, the power reception device comprising:
   a core unit having a plate-like shape and including a side surface, an upper surface and a lower surface, the side surface having a planar shape;
   a plate-like fixing member having the core unit housed therein;

a power reception coil spirally wound around a perimeter surface of the fixing member to surround a coil winding axis, the coil winding axis extending in a direction parallel to a frontward-backward direction of a main body of the vehicle; and a temperature measuring unit that measures a temperature of the core unit, the temperature measuring unit is provided in at least one of (i) a high-temperature region including a center portion of the core unit and a portion around the center portion, and (ii) a position on a surface of the fixing member that faces the high-temperature region, wherein a portion of the side surface of the core unit around which the power reception coil is wound is a side surface wound portion, and the center portion of the core unit is located at a center of the side surface wound portion in an extending direction of the coil winding axis and at a center of the core unit in a thickness direction of the core unit.

2. The power reception device according to claim 1, wherein the portion around the center portion is a region including a peripheral region of the side surface located on a periphery of the center portion, an upper surface adjacent region of the upper surface adjacent to the peripheral region, and a lower surface adjacent region of the lower surface adjacent to the peripheral region.

3. The power reception device according to claim 2, wherein the peripheral region is a region closer to the center portion in the extending direction of the coil winding axis than one end of a portion in which the power reception coil is wound around the fixing member, and closer to the center portion in the extending direction of the coil winding axis than the other end of the portion in which the power reception coil is wound around the fixing member, and the upper surface adjacent region and the lower surface adjacent region are regions located at a position closer to the side surface of the core unit than the coil winding axis in a direction orthogonal to the coil winding axis.

4. The power reception device according to claim 1, wherein the core unit includes a plurality of divided cores arranged side by side in a row direction and/or in a column direction.

5. The power reception device according to claim 1, wherein the temperature measuring unit is provided at the fixing member, and the temperature measuring unit is arranged to face the high-temperature region, with the fixing member interposed therebetween.

6. A vehicle, comprising:

the power reception device as recited in claim 1 mounted to the vehicle; and the vehicle main body having an exhaust pipe on a bottom surface thereof, wherein the power reception device is arranged below the exhaust pipe, and the temperature measuring unit is arranged to face the upper surface of the core unit.

7. A vehicle, comprising:

a control unit;

a communication unit for communicating with a power transmission device provided outside the vehicle; and the power reception device as recited in claim 1 mounted to the vehicle, wherein when the control unit determines that the temperature measured by the temperature measuring unit is equal to or higher than a threshold value, the control unit transmits a signal for stopping power transmission to the power transmission device through the communication unit.

8. The vehicle according to claim 7, wherein when the control unit determines that the temperature measured by the temperature measuring unit is lower than the threshold value, the control unit transmits a signal for starting or continuing power transmission to the power transmission device through the communication unit.

9. A vehicle, comprising:

a control unit;

a communication unit for communicating with a power transmission device provided outside the vehicle; and the power reception device as recited in claim 1 mounted to the vehicle, wherein when the control unit determines that the temperature measured by the temperature measuring unit is equal to or higher than a threshold value, the control unit transmits a signal for reducing transmitted electric power to the power transmission device through the communication unit.

10. A power transmission device that transmits electric power in a contactless manner to a power reception device having a power reception coil, with the power transmission device facing the power reception device, the power transmission device comprising:

a core unit having a plate-like shape and including a side surface, an upper surface and a lower surface, the side surface having a planar shape and being elongated in a longitudinal direction;

a plate-like fixing member having the core unit housed therein;

a power transmission coil spirally wound around a perimeter surface of the fixing member to surround a coil winding axis, the coil winding axis extending in a direction parallel to the longitudinal direction in which the side surface extends; and a temperature measuring unit that measures a temperature of the core unit, the temperature measuring unit is provided in at least one of (i) a high-temperature region including a center portion of the core unit and a portion around the center portion, and (ii) a position on a surface of the fixing member that faces the high-temperature region, wherein a portion of the side surface of the core unit around which the power transmission coil is wound is a side surface wound portion, and the center portion of the core unit is located at a center of the side surface wound portion in an extending direction of the coil winding axis and at a center of the core unit in a thickness direction of the core unit.

* * * * *